UNITED STATES PATENT OFFICE.

ROLAND HEINRICH SCHOLL, OF KARLSRUHE, GERMANY, ASSIGNOR TO BADISCHE ANILIN & SODA FABRIK, OF LUDWIGSHAFEN-ON-THE-RHINE, GERMANY, A CORPORATION.

COMPOUND OF THE ANTHRAQUINONE SERIES AND PROCESS OF MAKING SAME.

No. 828,778.     Specification of Letters Patent.     Patented Aug. 14, 1906.

Application filed February 6, 1906. Serial No. 299,776.

*To all whom it may concern:*

Be it known that I, ROLAND HEINRICH SCHOLL, professor of chemistry and doctor of philosophy, a subject of the Grand Duke of Baden, residing at Karlsruhe, in the Grand Duchy of Baden, German Empire, have invented new and useful Improvements in new Compounds of the Anthraquinone Series and Processes for Preparing the Same, of which the following is a specification.

My invention relates to the production of new compounds of the anthraquinone series.

I have discovered that by heating halogen anthraquinones with a metal, such as copper, which has the power of withdrawing halogen, I am enabled to obtain compounds in which two anthraquinone residues are joined together. To these new compounds I have given the name "dianthraquinonyl" compounds, and they are valuable starting materials for the production of coloring-matters. For instance, by condensing their halogen derivatives with aromatic amins and sulfonating the condensation products coloring-matters can be obtained which dye wool red. The new compounds which I desire to claim generically possess a greenish-yellow to yellowish-brown color, are crystallizable from xylene, and are soluble in nitrobenzene and in anilin. They are also soluble in concentrated sulfuric acid, yielding brown-yellow to yellow solutions. The new compound, which I desire to claim specifically, is 2.2'-dimethyl-1.1'-dianthraquinonyl, which can be obtained by heating 1-halogen-2-methylanthraquinone with copper-powder, and can by recrystallization from xylene be obtained in yellowish-brown prisms, which yield a yellow solution in concentrated sulfuric acid.

The following examples will serve to further illustrate the nature of my invention and the method of carrying it into practical effect; but the invention is not confined to these examples. The parts are by weight.

Example 1: Grind well together ten (10) parts of 1-iodo-2-methylanthraquinone and eight (8) parts of copper-powder, and then heat the mixture in a metal bath at a temperature of about two hundred and ten (210°) degrees centigrade. The iodin compound melts, and after a short time reaction takes place, yellow fumes being evolved, and the temperature of the mixture rises to about two hundred and ninety (290°) degrees centigrade, the mixture becoming hard. As soon as the temperature begins to fall apply heat and maintain for about fifteen (15) minutes a temperature of two hundred and seventy (270°) degrees centigrade. Allow the melt to cool and then grind it and, if necessary, further heat for ten (10) minutes at a temperature of two hundred and seventy (270°) degrees centigrade. In order to free the formed 2.2'-dimethyl-1.1' dianthraquinonyl from copper iodid and unaltered copper, treat the powdered reaction mixture for from one (1) to two (2) hours with dilute nitric acid at a temperature of about fifty (50°) degrees centigrade, filter off and wash with warm water and dry. The new compound can be recrystallized from xylene and obtained in the form of yellowish-brown prisms, which are easily soluble in boiling nitrobenzene and in boiling analin. They are also soluble in concentrated sulfuric acid, yielding a yellow solution.

Example 2: Mix well together ten (10) parts of 1-brom-2-methyl-anthraquinone and eight (8) parts of copper-powder and heat the whole in a metal bath at a temperature of two hundred and sixty (260°) degrees centigrade. After about half an hour (30 minutes) the temperature begins to lower, whereupon heat for another fifteen (15) minutes to a temperature of two hundred and seventy-five (275°) degrees centigrade. Allow the melt to cool, powder it finely, and then digest the powdered melt with dilute nitric acid for half an hour (30 minutes) at a temperature of about fifty (50°) degrees centigrade. Filter off and wash with warm water and dry. The 2.2'-dimethyl-1.1'-dianthraquinonyl formed can be purified by boiling with xylene and then evaporating to dryness the solution obtained.

Example 3: Heat together in a metal bath at a temperature of two hundred and sixty (260°) degrees centigrade ten (10) parts of 1-chlor-2-methyl-anthraquinone and eight (8) parts of copper-powder. The temperature of the mass rapidly rises to about two hundred and ninety (290°) degrees centigrade, and after from twenty (20) to thirty (30) minutes begins to lower. At this point apply external heat and maintain the melt for about fifteen (15) minutes at a temperature of two hundred and eighty (280°) degrees centigrade. Allow the melt to cool, powder it finely, and treat it with dilute nitric acid, as described in the foregoing Example 2, in order to free it from copper-powder, The 2.2'-dimethyl-1.1'-dianthraquinonyl thus obtained may be purified by treatment with xylene in the manner described in the foregoing Example 2.

Example 4: Mix well together four (4) parts of 1-iodo-2-methylanthraquinone and five (5) parts of finely-divided silver-powder and heat the whole in a metal bath at a temperature of from two hundred and sixty (260°) degrees centigrade to two hundred and seventy-five (275°) degrees centigrade and maintain the melt for about forty-five (45) minutes at this temperature. Allow the melt to cool, powder it finely, and heat again for thirty (30) minutes at the same temperature. After the melt has cooled powder it very finely and extract the 2.2'-dimethyl-1.1'-dianthraquinonyl formed by means of hot xylene.

Example 5: Heat together ten (10) parts of 4-iodo-1.3-diamethyl-anthraquinone (obtained from 1.3-dimethyl-anthraquinone by nitration, reduction, and exchanging the amido group for iodin) and eight (8) parts of copper-powder in a metal bath at a temperature of two hundred and ten (210°) degrees centigrade, the mass becomes fluid and the temperature rises rapidly to two hundred and forty-five (245°) degrees centigrade, and then falls again and the reaction products solidifies. The crude product can be extracted with benzene and the solution obtained concentrated. Upon recrystallization from benzene the new compound is obtained in yellow crystals.

Now what I claim is—

1. The process for the production of anthraquinone compounds by heating a halogen anthroquinone with a metal which has the power of withdrawing halogen.

2. The process for the production of anthraquinone compounds by heating a halogen anthraquinone with copper-powder.

3. The process for the production of 2.2'-dimethyl-1.1'-dianthraquinonyl by heating 1-halogen-2-methyl-anthraquinone with copper-powder.

4. As new articles of manufacture the anthraquinone compounds which can be obtained by heating a halogen anthraquinone with a metal which has the power of withdrawing halogen, which compounds possess a greenish-yellow to yellowish-brown color, and which are recrystallizable from xylene and are soluble in nitrobenzene and in anilin and are also soluble in concentrated sulfuric acid yielding brown-yellow to yellow solutions.

5. As a new article of manufacture 2.2'-dimethyl-1.1'-dianthraquinonyl which can be obtained by heating 1-halogen-2-methyanthraquinone with copper-powder, and which can by recrystallization from xylene be obtained in yellowish-brown prisms, which are soluble in nitrobenzene and in anilin and also in sulfuric acid yielding a yellow solution.

In testimony whereof I have hereunto set my hand in the presence of two subscribing witnesses.

ROLAND HEINRICH SCHOLL

Witnesses:
J. ALEC. LLOYD,
JOS. H. LEUTE.